United States Patent
Harada

(10) Patent No.: US 8,842,321 B2
(45) Date of Patent: Sep. 23, 2014

(54) INFORMATION PROCESSING APPARATUS, PRINTER DRIVER, PRINT SETTING METHOD AND DATA STRUCTURE

(71) Applicant: Konica Minolta, Inc., Tokyo (JP)

(72) Inventor: Yoshiyuki Harada, Saitama (JP)

(73) Assignee: Konica Minolta, Inc., Tokyo (JP)

( * ) Notice: Subject to any disclaimer, the term of this patent is extended or adjusted under 35 U.S.C. 154(b) by 183 days.

(21) Appl. No.: 13/648,047

(22) Filed: Oct. 9, 2012

(65) Prior Publication Data

US 2013/0094044 A1 Apr. 18, 2013

(30) Foreign Application Priority Data

Oct. 14, 2011 (JP) ................... 2011-226529

(51) Int. Cl.
*G06F 3/12* (2006.01)

(52) U.S. Cl.
CPC ............ *G06F 3/1205* (2013.01); *G06F 3/1225* (2013.01); *G06F 3/1285* (2013.01)
USPC ............ 358/1.15; 358/1.1; 358/1.13; 358/1.9

(58) Field of Classification Search
CPC ... G06F 3/1204; G06F 3/1205; G06F 3/1225; G06F 3/1285; G06F 3/1296
USPC ................... 358/1.15, 1.1, 1.13, 1.9; 235/375
See application file for complete search history.

(56) References Cited

U.S. PATENT DOCUMENTS

| | | | | |
|---|---|---|---|---|
| 5,337,258 A * | 8/1994 | Dennis | ......................... | 714/47.3 |
| 5,644,682 A * | 7/1997 | Weinberger et al. | ............ | 358/1.1 |
| 7,102,765 B1 * | 9/2006 | Abi-Saleh et al. | ............ | 358/1.13 |
| 7,339,696 B2 * | 3/2008 | Ferlitsch | ...................... | 358/1.16 |
| 7,733,507 B2 * | 6/2010 | Toumanova et al. | .......... | 358/1.13 |
| 7,839,516 B2 | 11/2010 | Tomita et al. | | |
| 2006/0221372 A1 * | 10/2006 | Onishi et al. | .................. | 358/1.13 |
| 2008/0005287 A1 * | 1/2008 | Harvey et al. | .................. | 709/220 |
| 2008/0068655 A1 | 3/2008 | Kimura | | |
| 2011/0026072 A1 * | 2/2011 | Xiao et al. | .................... | 358/1.15 |

FOREIGN PATENT DOCUMENTS

| | | |
|---|---|---|
| JP | 2003-91389 | 3/2003 |
| JP | 2008-97574 | 4/2008 |
| JP | 2010-186324 | 8/2010 |

* cited by examiner

*Primary Examiner* — Dennis Dicker
(74) *Attorney, Agent, or Firm* — Osha Liang LLP

(57) ABSTRACT

The information processing apparatus includes a storage section for storing function information on a function provided in a printing device, and a creating section for creating, based on the function information, a data structure having a data section for storing actual data of a setting value for the function and an index section for storing information for accessing the actual data of the setting value. In addition to the setting value for a printer driver which gives a printing instruction to the printing device, the creating section allows the data section to store a setting value which can be used by a printer driver which gives the printing instruction to a printing device of a different model and/or the printer driver of a different version.

15 Claims, 19 Drawing Sheets

CREATION PROCEDURE OF DEVMODE STRUCTURE

FIG. 7

FUNCTION SETTING INFORMATION

| FUNCTION GROUP: STAPLE | | | |
|---|---|---|---|
| ITEM | VALUE | DESCRIPTION OF VALUE | |
| FUNCTION ID | STAPLE(16) | STAPLE FUNCTION. FUNCTION ID IS 16 | FUNCTION INFORMATION FOR STAPLE |
| FUNCTION VERSION | 3 | | |
| DATA TYPE | UINT(4 BYTE) | DATA OF UINT (4 BYTE) | |
| DEFAULT VALUE | 0x00010000 | SETTING VALUE ID OF DEFAULT VALUE | |
| SETTING VALUE ID | 0x00010000 | OFF(LEFT CORNER) | |
| | 0x00020000 | OFF(RIGHT CORNER) | |
| | 0x00030000 | OFF(2 POSITION LEFT) | |
| | 0x00040000 | OFF(2 POSITION RIGHT) | |
| | 0x00050000 | OFF(2 POSITION TOP) | |
| | 0x00010001 | ON(LEFT CORNER) | |
| | 0x00020001 | ON(RIGHT CORNER) | |
| | 0x00030001 | ON(2 POSITION LEFT) | |
| | 0x00040001 | ON(2 POSITION RIGHT) | |
| | 0x00050001 | ON(2 POSITION TOP) | |
| FUNCTION COMPATIBILITY | 0x0302 | SETTING VALUE ID IS COMPATIBLE WHEN FUNCTION VERSION IS BETWEEN VERSIONS 2 – 3 | |
| CONVERSION INFORMATION | *DESCRIBED SEPARATELY | | |
| FUNCTION GROUP: PAGE LAYOUT | | | |
| ITEM | VALUE | DESCRIPTION OF VALUE | FUNCTION INFORMATION FOR N-UP |
| FUNCTION ID | N-UP(12) | MODE OF N-UP. FUNCTION ID IS 12 | |
| FUNCTION VERSION | 3 | | |
| DATA TYPE | UINT(4 BYTE) | DATA OF UINT(4 BYTE) | |
| DEFAULT VALUE | 0x00000000 | SETTING VALUE ID OF DEFAULT VALUE | |
| SETTING VALUE ID | 0x00000000 | OFF | |
| | 0x00010000 | ON(2 UP(LEFT → RIGHT)) | |
| | 0x00020000 | ON(2 UP(RIGHT → LEFT)) | |
| | 0x00030000 | ON(2 UP(TOP → BOTTOM)) | |
| | 0x00040000 | ON(2 UP(BOTTOM → TOP)) | |
| | 0x00050001 | ON(4 UP(LEFT TOP → RIGHT)) | |
| | 0x00060001 | ON(4 UP(LEFT TOP → BOTTOM)) | |
| | 0x00070001 | ON(4 UP(RIGHT TOP → LEFT)) | |
| | 0x00080001 | ON(4 UP(RIGHT TOP → BOTTOM)) | |
| FUNCTION COMPATIBILITY | 0x0301 | SETTING VALUE ID IS COMPATIBLE WHEN FUNCTION VERSION IS BETWEEN VERSIONS 1 – 3 | |
| CONVERSION INFORMATION | NONE | | |
| ITEM | VALUE | DESCRIPTION OF VALUE | FUNCTION INFORMATION FOR N-UP-BORDER |
| FUNCTION ID | N-UP-BORDER(63) | FRAME LINE AT THE TIME OF USE OF N-UP. FUNCTION ID IS 63 | |
| FUNCTION VERSION | 3 | | |
| DATA TYPE | SHORT(2 BYTE) | DATA OF SHORT(2 BYTE) | |
| DEFAULT VALUE | 0x0000 | SETTING VALUE ID OF DEFAULT VALUE | |
| SETTING VALUE ID | 0x0000 | OFF | |
| | 0x0001 | ON(FRAME) | |
| | 0x0002 | ON(LINE) | |
| FUNCTION COMPATIBILITY | 0x0303 | SETTING VALUE ID IS COMPATIBLE WHEN FUNCTION VERSION IS BETWEEN VERSIONS 3 – 3 | |
| CONVERSION INFORMATION | NONE | | |

FIG. 8

**FUNCTION SETTING INFORMATION
(IN THE CASE OF FUNCTION VERSION: 1 FOR STAPLE)**

DEFINITION FOR STAPLE AT THE TIME OF FUNCTION VERSION: 1

| FUNCTION GROUP: STAPLE | | |
|---|---|---|
| ITEM | VALUE | DESCRIPTION OF VALUE |
| FUNCTION ID | STAPLE(16) | STAPLE FUNCTION. FUNCTION ID IS 16 |
| FUNCTION VERSION | 1 | |
| DATA TYPE | SHORT (2 BYTE) | DATA OF SHORT (2 BYTE) |
| DEFAULT VALUE | 0x0000 | SETTING VALUE ID OF DEFAULT VALUE |
| SETTING VALUE ID | 0x0000 | OFF |
| | 0x0001 | ON(LEFT CORNER) |
| | 0x0002 | ON(RIGHT CORNER) |
| | 0x0003 | ON(2 POSITION LEFT) |
| | 0x0004 | ON(2 POSITION RIGHT) |
| | 0x0005 | ON(2 POSITION TOP) |
| FUNCTION COMPATIBILITY | 0x0101 | SETTING VALUE ID IS COMPATIBLE WHEN FUNCTION VERSION IS BETWEEN VERSIONS 1 – 1 |
| CONVERSION INFORMATION | *DESCRIBED SEPARATELY | |

FIG. 9

CONVERSION INFORMATION FOR STAPLE

| FUNCTION VERSION | | DATA TYPE | | SETTING VALUE ID | |
|---|---|---|---|---|---|
| FROM | TO | FROM | TO | FROM | TO |
| 0x0101 | 0x0302 | SHORT (2 BYTE) | UINT (4 BYTE) | 0x0000 | 0x00010000 |
| | | | | 0x0001 | 0x000100001 |
| | | | | 0x0002 | 0x000200001 |
| | | | | 0x0003 | 0x000300001 |
| | | | | 0x0004 | 0x000400001 |
| | | | | 0x0005 | 0x000500001 |
| 0x0302 | 0x0101 | UINT (4 BYTE) | SHORT (2 BYTE) | 0x00010000 | 0x0000 |
| | | | | 0x00020000 | 0x0000 |
| | | | | 0x00030000 | 0x0000 |
| | | | | 0x00040000 | 0x0000 |
| | | | | 0x00050000 | 0x0000 |
| | | | | 0x000100001 | 0x0001 |
| | | | | 0x000200001 | 0x0002 |
| | | | | 0x000300001 | 0x0003 |
| | | | | 0x000400001 | 0x0004 |
| | | | | 0x000500001 | 0x0005 |

FIG. 10
CONVERSION INFORMATION FOR STAPLE (ANOTHER METHOD)
| FUNCTION VERSION | | DATA TYPE | | COMPUTATION EXPRESSION |
|---|---|---|---|---|
| FROM | TO | FROM | TO | |
| 0x0101 | 0x0302 | SHORT (2 BYTE) | UINT (4 BYTE) | IF(FROM!=0)<br>  TO=((FROM << 16) \| 0x00000001)<br>ELSE<br>  TO=0x00010000 |
| 0x0302 | 0x0101 | UINT (4 BYTE) | SHORT (2 BYTE) | IF(FROM & 0x0000FFFF)<br>  TO=(SHORT)(FROM >> 16)<br>ELSE<br>  TO=0x0000 |
FIG. 11
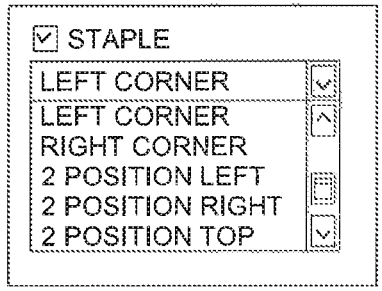
SETTING UI OF FUNCTION VERSION: 3 FOR STAPLE
FIG. 12
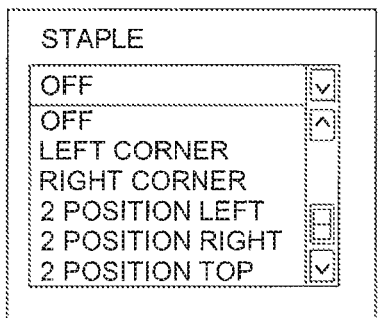
SETTING UI OF FUNCTION VERSION: 1 FOR STAPLE (1) REQUEST WRITING OF SETTING VALUE FOR STAPLE BY 0x00030001
(2) WRITE SETTING VALUE FOR STAPLE
(3) CONVERT SETTING VALUE BECAUSE CONVERSION EQUATION FOR CONVERTING TO OLD FUNCTION VERSION EXISTS IN CONVERSION INFORMATION
(4) WRITE SETTING VALUE FOR STAPLE (OLD FUNCTION VERSION)

OPERATION TABLE AT THE TIME OF SETTING VALUE CONVERSION

OPERATION AT THE TIME OF CONVERTING DEVMODE OF MODEL B TO MODEL A

| | MODEL B (CONVERSION ORIGIN) | | MODEL A (CONVERSION DESTINATION) | | OPERATION |
|---|---|---|---|---|---|
| | FUNCTION VERSION | FUNCTION COMPATIBILITY | FUNCTION VERSION | FUNCTION COMPATIBILITY | |
| CASE 1 | 1 | 1-1 | 1 | 1-1 | USE SETTING VALUE AS IT IS BECAUSE BOTH MODEL A AND MODEL B ARE VERSION 1. |
| CASE 2 | 1 | 1-1 | 3 | 1-3 | USE FUNCTION COMPATIBILITY INFORMATION OF MODEL A BECAUSE MODEL B IS VERSION 1. USE SETTING VALUE AS IT IS BECAUSE IT IS WITHIN THE RANGE. |
| CASE 3 | 3 | 1-3 | 1 | 1-1 | USE FUNCTION COMPATIBILITY INFORMATION OF MODEL B BECAUSE MODEL B IS VERSION 3. USE SETTING VALUE AS IT IS BECAUSE IT IS WITHIN THE RANGE. |
| CASE 4 | 1 | 1-1 | 3 | 2-3 | USE FUNCTION COMPATIBILITY INFORMATION OF MODEL A BECAUSE MODEL B IS VERSION 1. USE AFTER CONVERTING SETTING VALUE OF MODEL B BASED ON CONVERSION INFORMATION BECAUSE IT IS OUTSIDE THE RANGE. |
| CASE 5 | 3 | 2-3 | 1 | 1-1 | USE FUNCTION COMPATIBILITY INFORMATION OF MODEL B BECAUSE MODEL B IS VERSION 3. USE VALUE (VALUE OF FUNCTION VERSION OF MODEL A) OF SETTING VALUE (OLD VERSION) OF MODEL B BECAUSE IT IS OUTSIDE THE RANGE. |
| CASE 6 | NO FUNCTION | | 3 | 1-3 | THERE IS NO CONVERSION ORIGIN BECAUSE OF NO FUNCTION IN MODEL B. USE DEFAULT VALUE OF MODEL A. |
| CASE 7 | 3 | 1-3 | NO FUNCTION | | NO ACTION IS TAKEN BECAUSE THERE IS NO FUNCTION IN MODEL A (PROCESSING DOES NOT RUN EITHER). |

INFORMATION PROCESSING APPARATUS, PRINTER DRIVER, PRINT SETTING METHOD AND DATA STRUCTURE

This application is based on Japanese Patent Application No. 2011-226529 filed on Oct. 14, 2011 with Japan Patent Office, the entire content of which is hereby incorporated by reference.

BACKGROUND OF THE INVENTION

The present invention relates to an information processing apparatus, printer driver, print setting method and data structure, and particularly to an information processing apparatus, printer driver, and print setting method in which a DEVMODE structure is used for print setting, and a DEVMODE structure.

When a printing device is used to print a document file, print setting is performed using a printer driver installed on a client's computer device connected to a network. The data is converted into a printing job in the Page Description Language format (PDL) and is sent to a printing device. Receiving the printing job, the printing device rasterizes the printing job (bit map development) to generate image data. This image data is then subjected to processes of screening and image adjustment and is outputted onto a paper medium.

Here, various settings of the printer driver (such as information about the model of the printing device that carries out printing ins rum and print setting information for the printing device) are stored in the client's computer device as data called a DEVMODE structure. Thus, if the DEVMODE structure is associated with a document file, the previous print setting can be used when that document file is later printed again. Accordingly; the printing operation can be simplified.

However, the information (DEVMODE information) stored in the DEVMODE structure depends on the printer driver of the computer device having given a printing instruction. Therefore, the above-mentioned DEVMODE information cannot be taken over when using a printer driver for a printing device of a different model or a printer driver of a different version, even if the DEVMODE structure has been associated with a document file.

For example, when the document Mr. A created using a printer driver for printing devices of Model A is to be employed by Mr. B using another printer driver for printing devices of Model B, or when the document Mr. A created using the printer driver of version 1 for printing devices of Model A is to be employed by Mr. B using the printer driver of version 2 for printing devices of Model A, new print setting must be made because there is no DEVMODE structure that supports printer drivers compatible with different models of printing devices or different versions of printer drivers.

In the case of dynamic switching of plurality of models such as when using a UPD (Universal Printer Driver), there are cases it is preferable to take over the print settings prior to model switching.

To solve these problems, for example, the Japanese Unexamined Patent Application Publication No. 2008-97574 discloses an information processing apparatus for generating data that can be processed by a printing device, with the information processing apparatus including: an information storage means for storing the function setting information which relates to the function of the aforementioned printing device; and a data structure assigning means for acquiring the function setting information from the information storage means and securing the area for assigning the print setting value to be set in conformity to the function setting information, to a data structure for storing the print setting of the printing device, and assigning the aforementioned area with the print setting value; and a data creation means for creating data that can be processed by the printing device from the print setting value assigned to the data structure by the data structure assigning means, by referring to the function setting information stored in the aforementioned information storage means.

Further, the Japanese Unexamined Patent Application Publication No. 2010-186324 discloses a printer driver wherein a computer is used to allow a printer to perform printing operations in response to a printing request given by an application program. The aforementioned printer driver includes a reference step of referring to the setting information of another printer driver installed on the aforementioned computer, and a setting step of performing setting operations of its own printer driver by using the setting value of the item required to set its own printer driver, out of the referred setting information to allow the computer to execute.

To ensure that a DEVMODE structure can be used by a printer driver for a different model or a printer driver of a different version, the DEVMODE structure of the original printer driver needs to be converted into a DEVMODE structure compatible with the printer driver of new model or a new version, as described above. However, a DEVMODE structure is described in a hard code (C language), which cannot be converted easily.

Further, to convert from the DEVMODE structure of a printer driver for a different model or a printer driver of a different version, it is necessary to store the structure definition of the printer driver for the original model or structure definition of the printer driver of the original version. Accordingly, when there are printer drivers for a plurality of models or printer drivers of a plurality of versions, the information to be stored will be increased to a huge volume.

Further, if the conversion origin is a printer driver for an older model or printer driver of an older version, the structure definition can be predicted. However, if the conversion origin is a printer driver liar a new model or printer driver of a new version, it is difficult to predict the structure definition.

SUMMARY

In view of the problems described above, it is a major object of the present invention to provide an information processing apparatus, printer driver, print setting method and data structure capable of generating a data structure (DEVMODE structure) that can be used by a printer driver for a different model or a printer driver of a different version.

To achieve at least one of the aforementioned objects, an in processing apparatus reflecting one aspect of the present invention includes a storage section for storing function information on a function provided in a printing device and a creating section for creating, based on the function information, a data structure including a data section for storing actual data of a setting value for the function and an index section for storing information for accessing the actual data of the setting value. In addition to the setting value for a printer driver which gives a printing instruction to the printing device, the creating section allows the data section to store the setting value which can be used by a printer driver which gives the printing instruction to the printing device of a different model armor the printer driver of a different version.

Further, an embodiment of the present invention provides a printer driver operated in an apparatus whirl gives a printing instruction to a printing device. The printer driver allows the apparatus to function as a creating section which creates, based on previously stored function information on a function provided in the printing device, a data structure including a data section which stores actual data of it setting value for the function and an index section which stores information for accessing the actual data of the setting value. In addition to the setting value for the printer driver, the creating section allows the data section to store the setting value which can be used by a printer driver which gives the printing instruction to the printing device of a different model and/or the printer driver of a different version.

Further, an embodiment of the present invention provides a print setting method in an apparatus which gives a printing instruction to a printing device. The print setting method includes a creating step of creating, based on previously stored function information on a function provided in the printing device, a data structure including a data section which stores actual data of a setting value for the function and an index section which stores information for accessing the actual data of the setting value. In the creating step, in addition to the setting value for a printer driver for giving the printing instruction to the printing device, the setting value which can be used by a printer driver which gives the printing instruction to the printing device of a different model and/or the printer driver of a different version is stored in the data section.

Further an embodiment of the present invention provides a data structure created by an apparatus which gives a printing instruction to a printing device. The data structure includes a data section which stores actual data of a setting value for a function provided in the printing device and an index section which stores information for accessing the actual data of the setting value. In addition to the setting value for the printer driver for giving the printing instruction to the printing device, the data section stores the setting value which can be used by a printer driver which gives the printing instruction to the printing device of a different model and/or the printer driver of a different version.

BRIEF DESCRIPTION OF TIM DRAWINGS

FIG. 7 shows an example of function setting information according to an embodiment of the present invention.

FIG. 8 shows an example of function setting information (for function version: 1 for Staple) according to an embodiment of the present invention.

FIG. 9 shows an example of Staple conversion information.

FIG. 10 shows another example of Staple conversion information.

FIG. 11 shows an example of setting UI for function version: 3 for Staple according to an embodiment of the present invention.

FIG. 12 shows an example of setting UI for function version: 1 for Staple according to an embodiment of the present invention.

Figure 16:
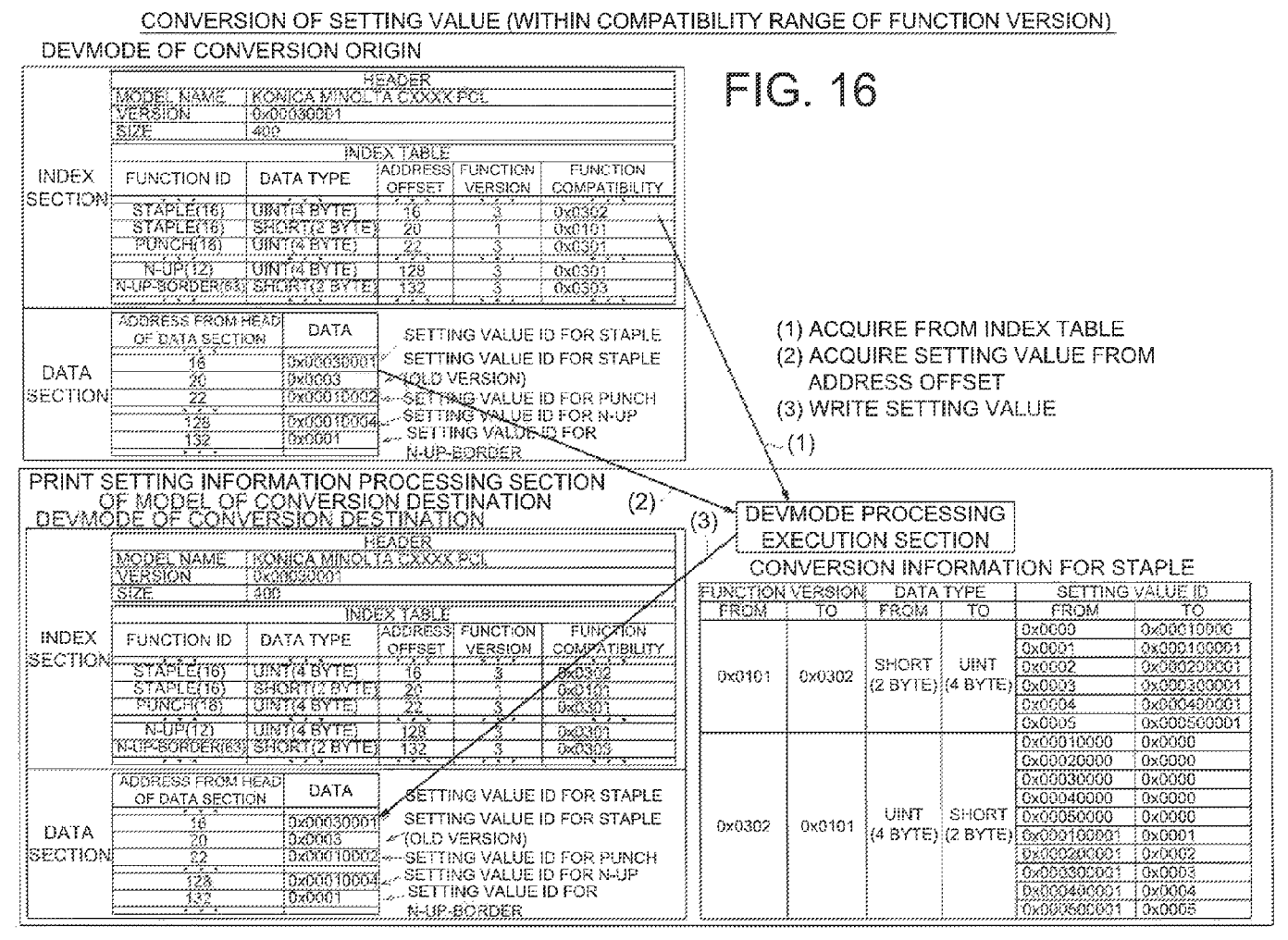

FIG. 16 is a diagram schematically showing conversion processing of the setting value (within the range of compatibility between function versions) according to an embodiment of the present invention.

FIGS. 21-1 and 21-2 show a flow chart showing conversion processing of the setting value according to an embodiment of the present invention.

FIG. 22 shows an example of the operation table for conversion of the setting value according to an embodiment of the present invention.

DETAILED DESORPTION OF THE PREFERRED EMBODIMENT

As shown in the description of the BACKGROUND OF THE INVENTION, when a printer driver is used for printing, a data structure called a DEVMODE structure is generated. By associating the DEVMODE structure with a document file, the previous print setting can be taken over when the document file is printed again. However, since a DEVMODE structure is information which depends on the printer driver having given printing instructions, the print setting in the DEVMODE structure cannot be taken over in the case of a printer driver for a printing device of a different model or a printer driver of a different version. This has created a problem of complicated printing operations. Further, although converting a DEVMODE structure is a possible way to make use of a printer driver for a printing device of a different model or a printer driver of a different version, it is not easy to convert it because a DEVMODE structure is described in the hard code (C language).

A DEVMODE structure is composed of the Public DEVMODE as a common definition among printer vendors, defined by Microsoft (registered trademark) and the private DEVMODE that can be freely defined, by each printer vendor. In an embodiment of the present invention, the private DEVMODE is made to be composed of an index section and a data section. The data section allows writing of not only various types of setting information of the current printer driver but also various types of setting information (e.g., setting value of an old version for each function) which can be used by a printer driver for a printing device of a different model and a printer driver of a different version. The index section allows writing of the address information that specifies where to access in the data section when printer drivers for printing devices of various models or printer drivers of various versions read various types of setting information.

Because of this structure, the setting information described in a DEVMODE structure can be easily used by a printer driver for a printing device of a different model or a printer driver of a different version, with the result that printing operations are simplified.

EXAMPLES

Figure 1:
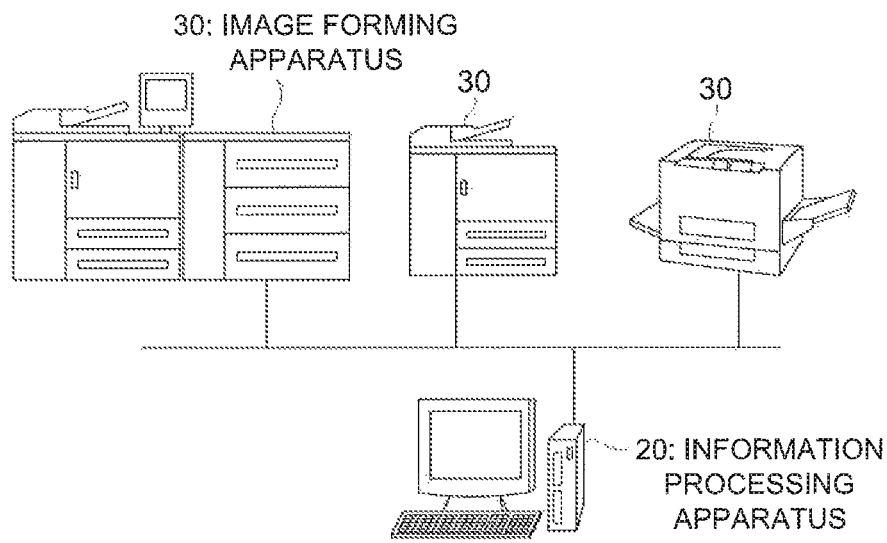
FIG. 1 is a drawing schematically representing the structure of a printing system according to an embodiment of the present invention.
Figure 2:
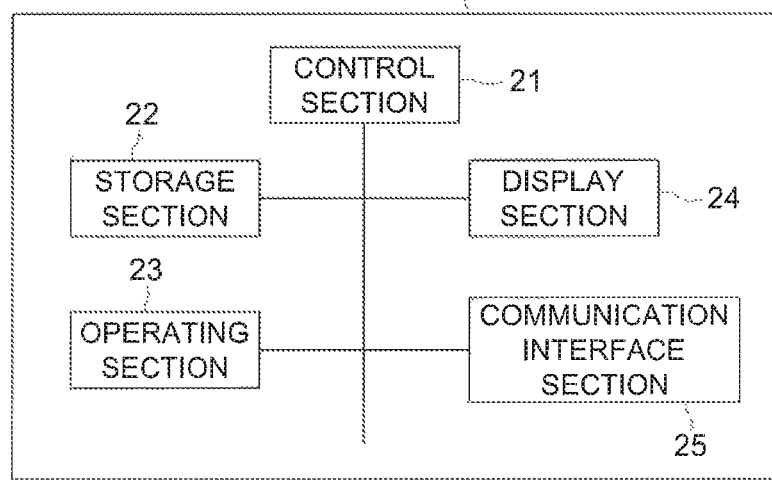
FIG. 2 is a block diagram representing the structure of an information processing apparatus according to an embodiment of the present invention.
Figure 3:
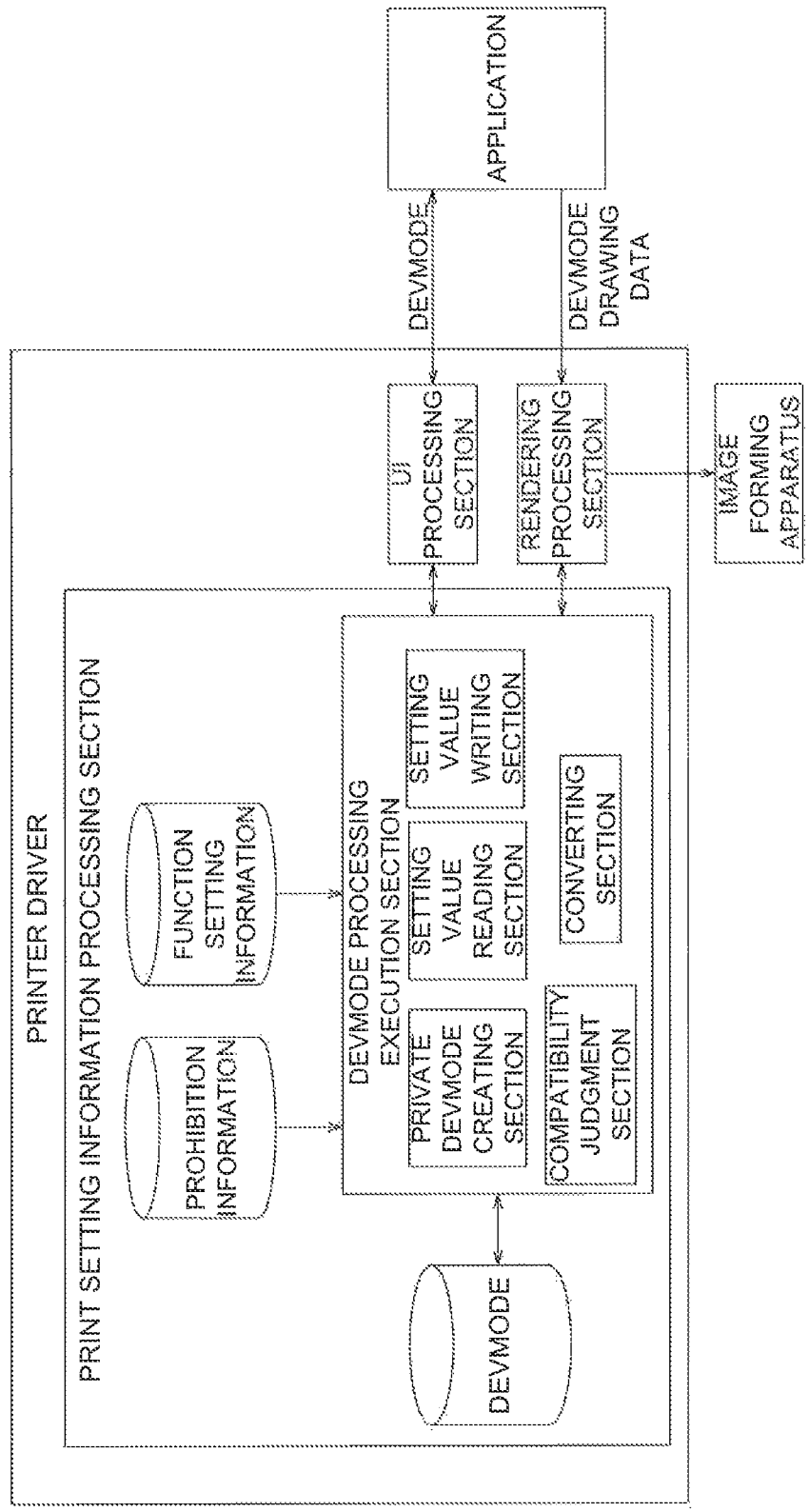
FIG. 3 is a block diagram representing the structure of a printer driver according to an embodiment of the present invention.
Figure 4:
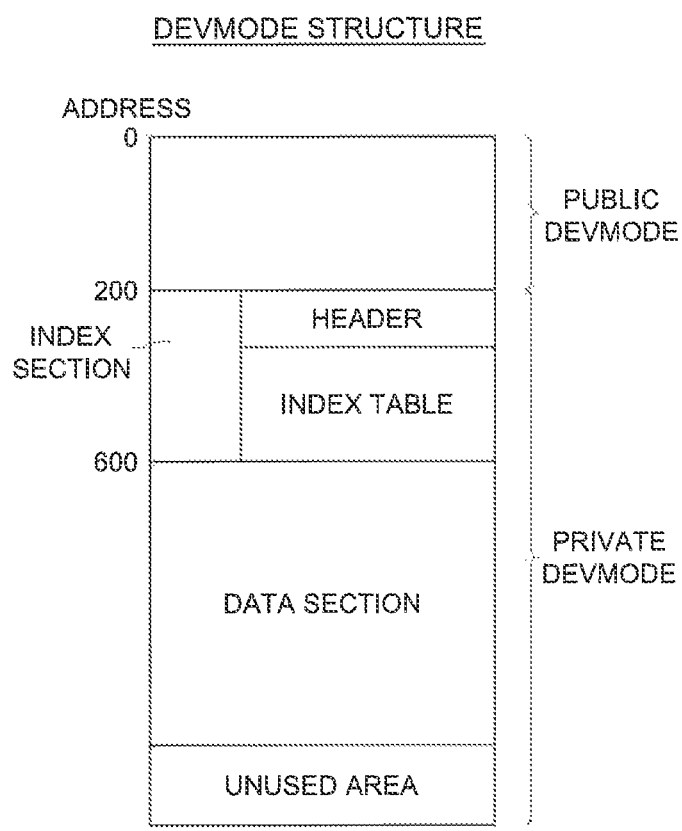
FIG. 4 is a diagram representing the outline structure of a DEVMODE structure according to an embodiment of the present invention.
Figure 5:
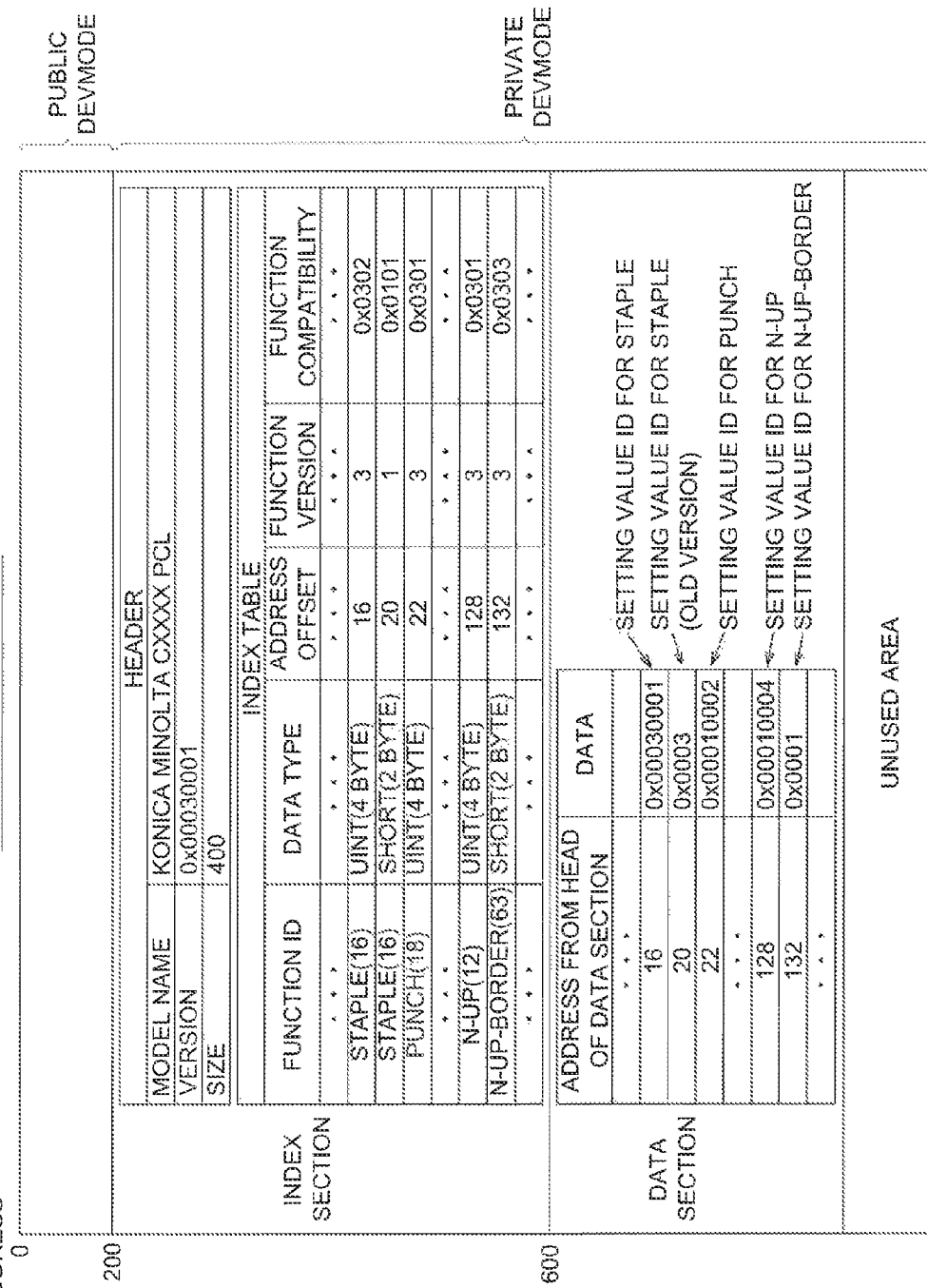
FIG. 5 is a diagram representing the detailed structure of a DEVMODE structure according to an embodiment of the present invention.
Figures 6A, 6B, 6C:
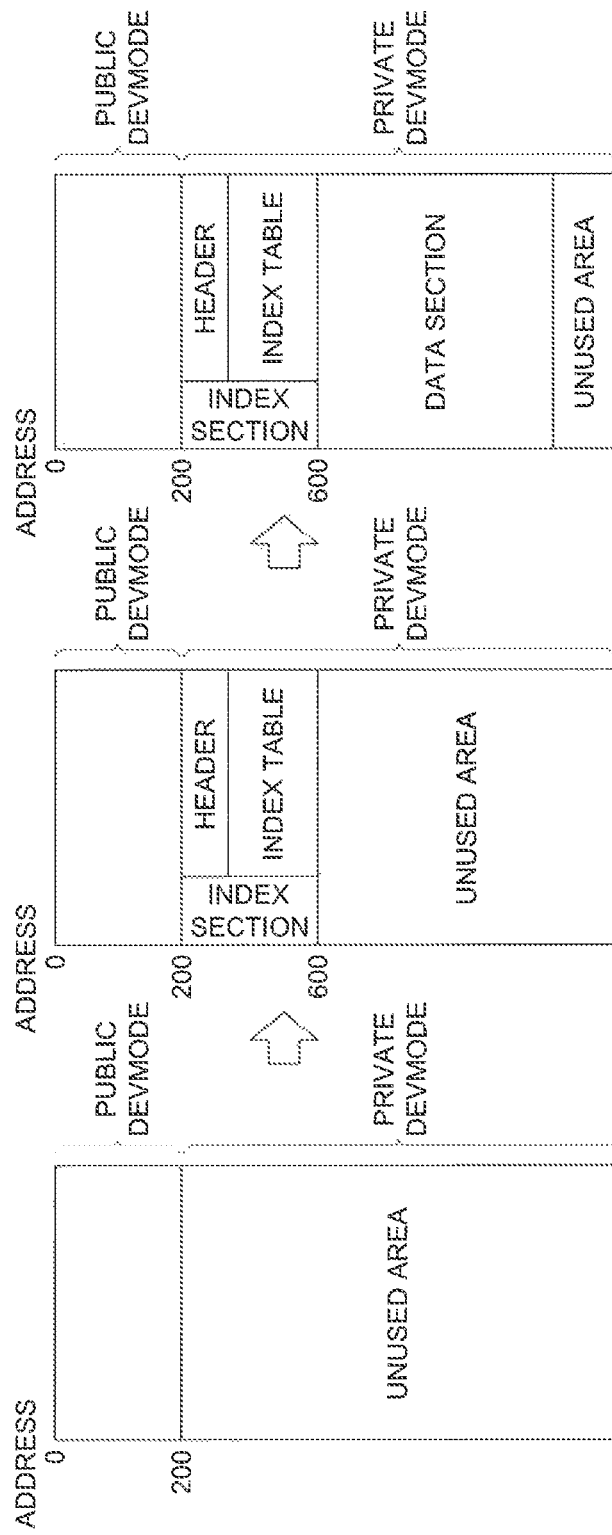
FIGS. 6a, 6b and 6c are diagrams schematically showing the procedure of generating a DEVMODE structure according to an embodiment of the present invention.
Figure 13:
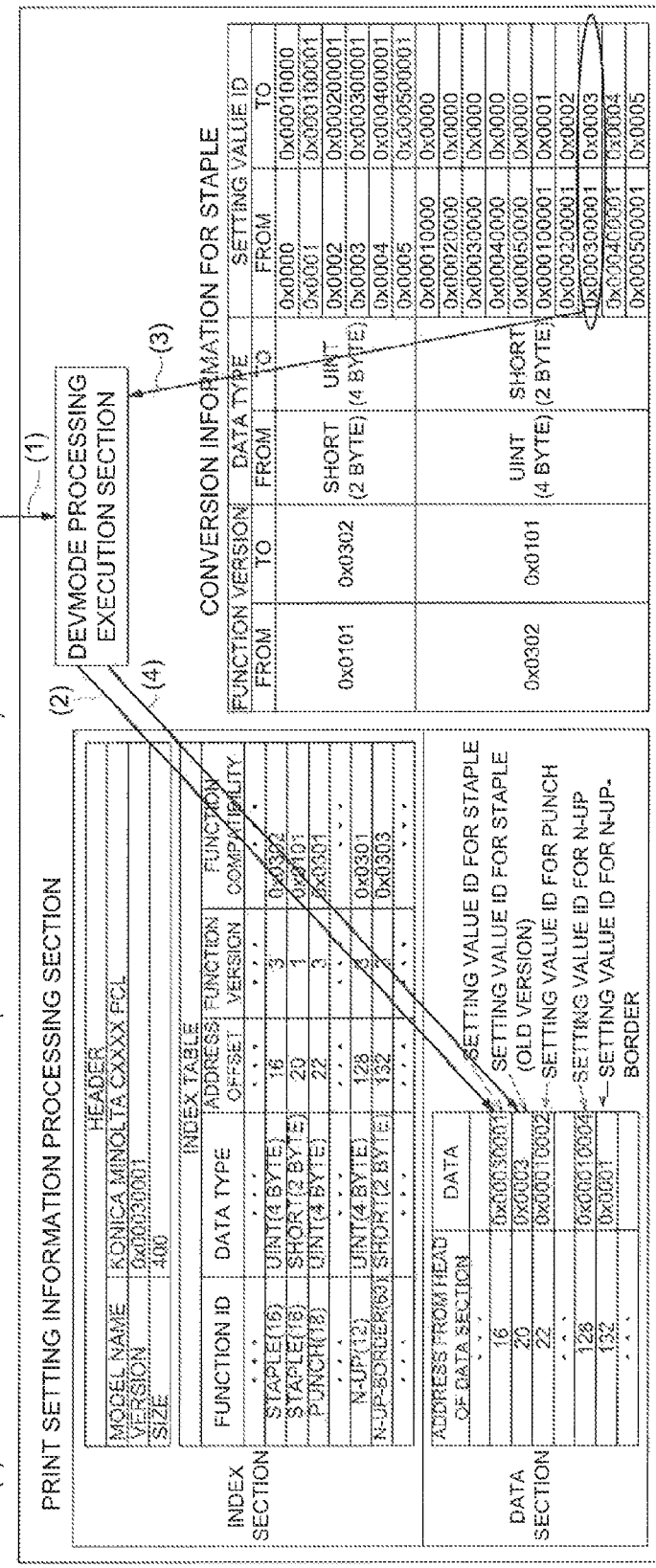
FIG. 13 is a diagram schematically showing writing processing of the setting value according to an embodiment of the present invention.
Figure 14:
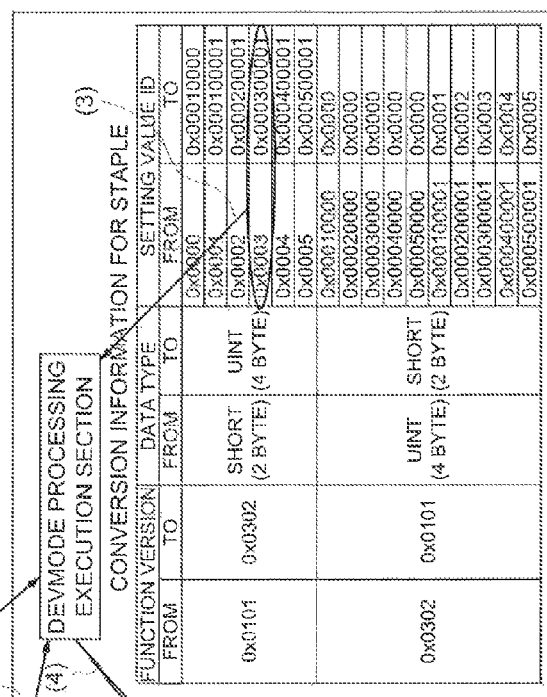
FIG. 14 is a diagram schematically showing conversion processing of the setting value (from an old function version to a new function version) according to an embodiment of the present invention.
Figure 15:
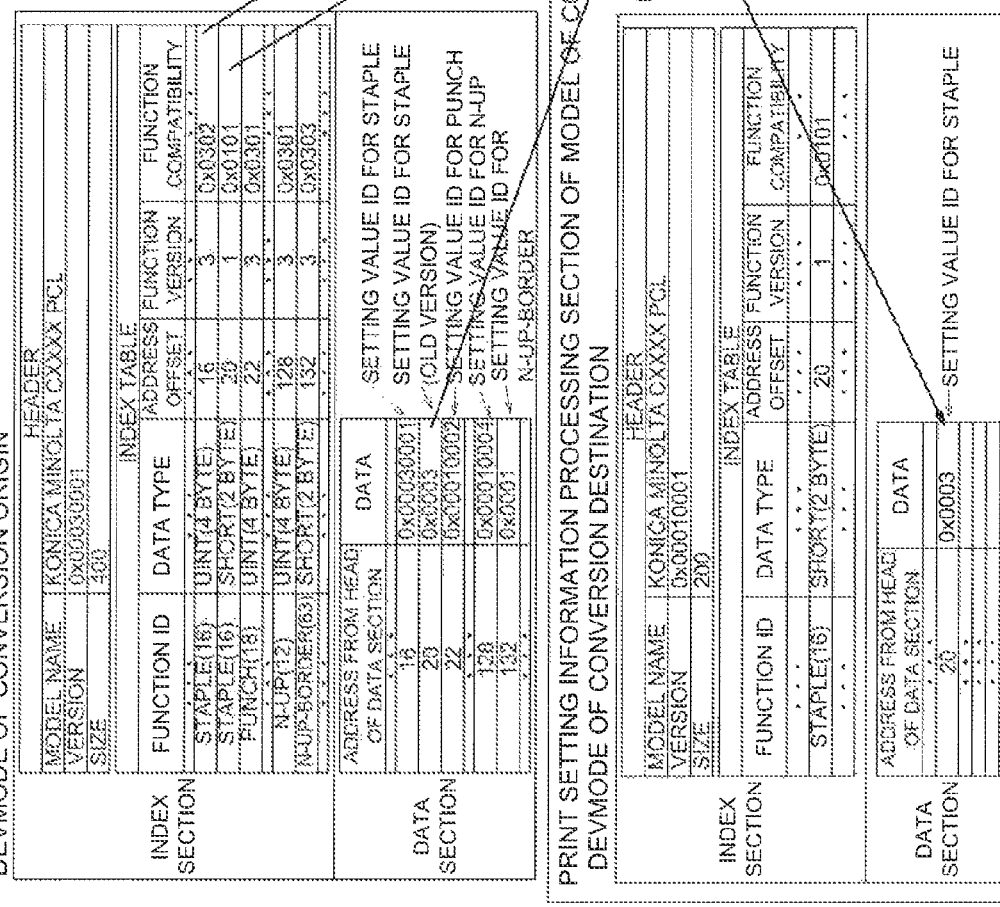
FIG. 15 is a diagram schematically showing conversion processing of the setting value (from a new function version to an old function version) according to an embodiment of the present invention.

In order to describe the preferred embodiment of the present invention in detail, referring to FIG. 1 through FIG. 22, an information processing apparatus, a print setting program, a print setting method and a data structure, relating to an embodiment of the present invention, will be detailed in the following. FIG. 1 shows a schematic diagram of a configuration of the printing system structure of the present embodiment, FIG. 2 shows a block diagram showing a configuration of an information processing apparatus of the present embodiment, and FIG. 3 shows a block diagram showing a configuration of the printer driver of the present embodiment. FIGS. 4 and 5 show diagrams showing configurations of the DEVMODE structure, and FIGS. 6*a*, 6*b* and 6*c* show schematic diagrams of the procedure of creating the DEVMODE. Further, FIGS. 7 and 8 show examples of function setting information of the present embodiment and FIGS. 9 and 10 show examples of the Conversion Information of Staple. Still further, FIGS. 11 and 12 show examples of the setting UI of the present embodiment, FIG. 13 shows a diagram showing schematically writing processing of the setting vain; and FIGS. 14-16 show diagrams indicating schematically conversion processing of the setting value. Still further, FIGS. 17-21 show flowcharts illustrating procedure executed in the information processing apparatus of the present embodiment and FIG. 22 shows an example of operation table at the time of converting the setting value.

As shown in FIG. 1, a printing system 10 of the present embodiment is constituted by a single or a plurality of client apparatus (hereinafter, referred to as information processing apparatus 20) each of which instructs to print a document made by an application for creating a document and a single or a plurality of printing devices (hereinafter, referred to as image forming apparatus 30), such as a printer, a digital multi-functional apparatus), etc., each of which implements printing based on the instructions sent from the information processing apparatus 20. The single or the plurality of information processing apparatus 20 and the single or the plurality of image forming apparatus 30 are coupled to each other through a communication network, such as a LAN (Local Area Network), a WAN (Wide Area Network), etc. Details of each apparatus will be described as follows.

[Information Processing Apparatus]

As shown in FIG. 2, the information processing apparatus 20 is provided with a control section 21, a storage section 22, an operating section 23, a display section 24, a communication interface section 25, etc.

The control section 21 is constituted by a CPU (Central Processing Unit), a ROM (Read Only Memory), a RAM (Random Access Memory), etc. The CPU reads out an OS (Operating System), an application for creating a document, a device driver (a printer driver) for controlling the image forming apparatus 30, etc., from the ROM or the storage section to develop them on the RAM. Then, the CPU executes the programs developed on the RAM.

The storage section 22 is constituted by an HDD (Hard Disk Drive), etc., so as to store programs and data therein. In the present embodiment, especially the storage section 22 stores function setting information to be referred to when creating DEVMODE structure.

The operating section 23 is constituted by a keyboard, a mouse, etc., so as to make it possible to conduct setting operations in regard to a document creation and a printing.

The display section 24 is constituted by a LCD (Liquid Crystal Display), etc., so as to display a setting screen of the printer driver or the like.

The communication interface section 25 is constituted by a NIC (Network Interface Card), a modem or the like, so as to make it possible to communicate with the image forming apparatus 30.

As shown in FIG. 3, the aforementioned printer drivers make a control section 21 of an information processing apparatus 20 to function as a print setting information processing section a UI (User Interface) processing section and a rendering processing section.

The aforementioned print setting information processing section is composed of a DEVMODE processing execution section and a database referenced by the DEVMODE processing execution section. The DEVMODE processing execution section is made of a private DEVMODE creating section that dynamically creates the private DEVMODE; a setting value reading section that reads the setting value preset on the private DEVMODE; a setting value writing section that writes the setting value on the private DEVMODE; a compatibility judgment section that determines the compatibility of the setting value; and a conversion section that converts the inputted setting value of the private DEVMODE into a setting value for the printer driver of the current version of this device. Further, the database stores function setting information including the DEVMODE information described in the DEVMODE structure, prohibition information describing the prohibition conditions of combination of functions, and function information (e.g., functions, settable values and versions) held by an image forming apparatus 30 of each model.

The UI processing section receives DEVMODE information from an application and displays the print setting screen. For displaying the print setting screen, the DEVMODE information is transferred to the DEVMODE processing execution section, where the DEVMODE information is interpreted. After that, setting values are acquired for each function and are reflected on the print setting screen. If the DEVMODE information is changed by the user on the print setting screen, a request is sent to the DEVMODE processing execution section to write the setting value so that the DEVMODE information is updated. After termination of the processing, the updated DEVMODE information is sent back to the application.

Without opening the print setting screen, the UI processing section transfers DEVMODE information to the DEVMODE processing execution section. If the DEVMODE information is the information generated by the printer driver of a different model or version of the image forming apparatus 30 to be controlled, this information is converted, by the conversion section into the DEVMODE information for the printer driver of the current version for the current device. The converted DEVMODE information is sent back to the application. Further, without opening the print setting screen, the UI processing section generates DEVMODE information by the initial value, and the generated DEVMODE information is sent back to the application.

The rendering processing section generates drawing data that can be interpreted by the image forming apparatus 30, based on the DEVMODE information and drawing data acquired from the application. At the time of generating drawing data, the DEVMODE information is transferred to the DEVMODE processing execution section, where the DEVMODE information is interpreted. Then the setting value for each function is acquired to execute PJL (Printer Job Language) or PDL processing.

FIG. 1 shows a personal computer as an information processing apparatus 20. The information processing apparatus 20 can be any device that is capable of controlling the image forming apparatus 30. Further, in FIG. 3, the printer driver has functions of the print setting information management section, UI processing section and rendering processing section. However, at least one of these sections can be designed as a hardware component of the information processing apparatus 20.

[Image Forming Apparatus]

The image forming apparatus 30 is constituted by a control section, a storage section, network internee section, a display operating section, an image processing section, a print processing section, a post processing section (not illustrated), and others, which are coupled to each other through a bus.

The control section is constituted by a CPU, a ROM, a RAM, etc. and the CPU reads out various kinds of programs from the ROM or the storage section to develop them on the RAM. Then, the CPU executes the programs developed on the RAM.

The storage section is constituted by an HDD, etc., so as to store the programs controlling the operations of the image forming apparatus 30 and the print job acquired from the information processing apparatus 20.

The network interface section is constituted by a NIC, a modem, etc., so as to make it possible to communicate with the information processing apparatus 20.

The display operating section is constituted by a display section, such as a LCD, and an operating section, such as a touch panel, so as to display an icon or a key button on the LCD, etc., and to output operational signals inputted from the touch panel or the like, to the CPU.

The image processing section interprets the printing job received from the information processing apparatus 20 and creates image data of each page of the document. Then, when necessary, it applies image processing such as color conversion and density adjustment to the created image data.

The print processing section is made up of a component necessary to form an image using the image forming process such as electrophotographic process or electrostatic recording process. An image is formed on a designated paper based on the image data created by the image processing section.

The post-processing section applies post-processing such as stapling, punching and N-up operation to the paper on which an image has been formed by the print processing section.

The image forming apparatus 30 can be any device that is capable of printing in conformity to the instruction of the information processing apparatus 20. There is no particular restriction to the structure. Further, in the present embodiment, the information processing apparatus 20 is designed to give printing instructions to the image forming apparatus 30. However, it is also possible to make such arrangements that a control device such as a printer controller is connected to a communication network so that the information processing apparatus 20 issues a printing instruction to the printer controller.

The following describes the DEVMODE structure of the present embodiment with reference to FIG. 4. A DEVMODE structure is composed of a block called the public DEVMODE, which serves as a common definition among printer vendors, defined by Microsoft (registered trademark), and a block called the private DEVMODE, which can be freely defined by each printer vendor. The private DEVMODE is formed of the index section (data structure common to the printer drivers for all models) that stores the setting value items and address offset values for the storage locations and the data section that stores the actual setting values. Further, the index section consists of a "header" for storing the model name of the image forming apparatus 30, version number of the printer driver and size of the index table or the like; and an "index table" for holding the function identifier; data type, address onset values for storage locations of the setting value, function version and compatibility information (information in the range of the function versions where the setting values are compatible, which is called function compatibility) or the like.

To be more specific, the private DEVMODE of the conventional DEVMODE structure consists of only a data section, and the data section stores the current printer driver setting value. However, in the present embodiment, an index section has been added to the private DEVMODE so that the data section stores the current printer driver setting value and the setting value that can be used by the printer driver that controls the image forming apparatus 30 of a different model or the printer driver of a different version. The index section stores address information that specifies which information in the data section each printer driver should reference. This will eliminate the need of a structure definition of private DEVMODE by a hard code, so that the private DE MODE can be read by a printer driver for controlling the image forming apparatus 30 of a different model or a printer driver of a different version.

FIG. 5 is a schematic diagram representing the actual data of a DEVMODE structure. The header of the index section stores the model name of the image forming apparatus 30, version number of the printer driver and size of the index section. Further, the index table of the index section stores a record including the function ID for identifying functions, data typo showing the data type of the setting value, address offset showing the offset to the storage location of the setting value from the top in the data section, function version, and function compatibility representing the compatibility of the function.

"Function compatibility: 0x0301" FIG. 5 indicates that the setting values are compatible in the range from function version: 1 to function version: 3. Further, the head address 600 in the data section is calculated based on the value 400 stored in the header of the index section (i.e., obtained by adding 400 as the size of the index section to 200 as the head address of the index section). In this figure, the setting value identified by the setting value ID for Staple is stored at address 616 (16th from the head position of data section).

The function ID for Staple will be used as a sample in the following description. There are two records in the index table. The record "function version: 3" relates to the setting value of the current function version. The record "function version: 1" relates to the setting value of the old function version. The setting value located at the address 16 from the head position of the data section is the setting value of the current function version. The setting value located at the address 20 from the head position of the data section is the setting value of the old function version.

When the aforementioned DEVMODE processing execution section (private DEVMODE creating section) generates the DEVMODE structure of the aforementioned structure, a necessary and sufficient area for private DEVMODE is secured, as shown in FIG. 6a. The index section (header and index table) of the private DEVMODE is then generated, as shown in FIG. 6b, and the setting value is written into the data section, as shown in FIG. 6c.

FIG. 7 shows an example of the function setting information to be referenced when the setting value is written into the private DEVMODE. The information of all functions that can be set by the printer driver is stored. The stapling function information will be used as an example for the following description. The function ID identifies the functions, "Staple (16)" is shown in the table, but what is actually stored is the numerical value "16". The function version denotes the version number of the current function. The data type represents a setting value data type. The data type such as String (32 characters) can be assumed in addition to such a value as UINT (4-byte). The default value is a default setting value ID. The setting value ID is given in the form of a list of the setting values that can be set. The function compatibility is information on the range of the versions where the alternatives of a specific function ID are compatible. For example, 0x0302 indicates that the setting value ID is compatible when the function version is within the range from version: 2 to version: 3. The conversion information is shown by the conversion information table for the setting values among different function versions. This table includes conversion information for setting values from the old function version to the new function version (the current function version), and from the new function version to the old function version.

When the setting values are to be stored, the setting values (old versions) of the old function versions are generated and stored based on the conversion information. This eliminates the need of storing a large amount of conversion information in units of DEVMODE, and permits two-way conversions of setting value turn the old version to the new version, and from the new version to the old version.

FIG. 8 shows an example of the function setting information (for function version: 1 for Staple). This is different from the Staple (function version: 3) of FIG. 7 in data type, setting value ID, function compatibility and others.

FIG. 9 shows an example of conversion information for Staple. The function version has information on conversion of setting values from a specific range to another specific range. For example, "From: 0x0101, To: 0x0302" shows that the function version is converted from the range of 1 to 1 to the range of 2 to 3. The data type defines the data types of conversion origin and conversion destination. The data of conversion origin and conversion destination is mapped by the setting value ID.

FIG. 10 shows another example (another method) of conversion information for Staple. The difference from FIG. 9 is that an arithmetic expression is used for creation, without the setting value ID being replaced.

FIG. 11 and FIG. 12 show an example of the setting UI for function version: 3 and function version: 1 of the Staple. As illustrated, there is a difference in the UI structure and a way to set a setting value in the same function to improve the user convenience. Modification of FIG. 7 and FIG. 8 has been applied to the setting value ID. In this example, when the function is in version: 2, modification is made in such a way that the Staple On/Off and Staple mode will be handled as independent items.

The following describes the specific processing of the printer driver:

[Creation Processing of Private DEVMODE]

FIG. 13 is a schematic diagram of the creation processing of the private DEVMODE The private DEVMODE is generated by procedures (1) through (4). (1) A request is made to write the Staple setting value as "0x00030001" from a writing requester. The writing requester is the UI processing section, for example. (2) In the DEVMODE processing execution section, the setting value of the current function version of the Staple function is written into the data section. (3) In the DEVMODE processing execution section, since information of conversion into the old function version is included in the conversion information in the function setting information, the setting value is converted to the setting value of the old function version. (4) In the DEVMODE processing execution section, the setting value of the old function version of the Staple function is written into the data section.

Figure 17:
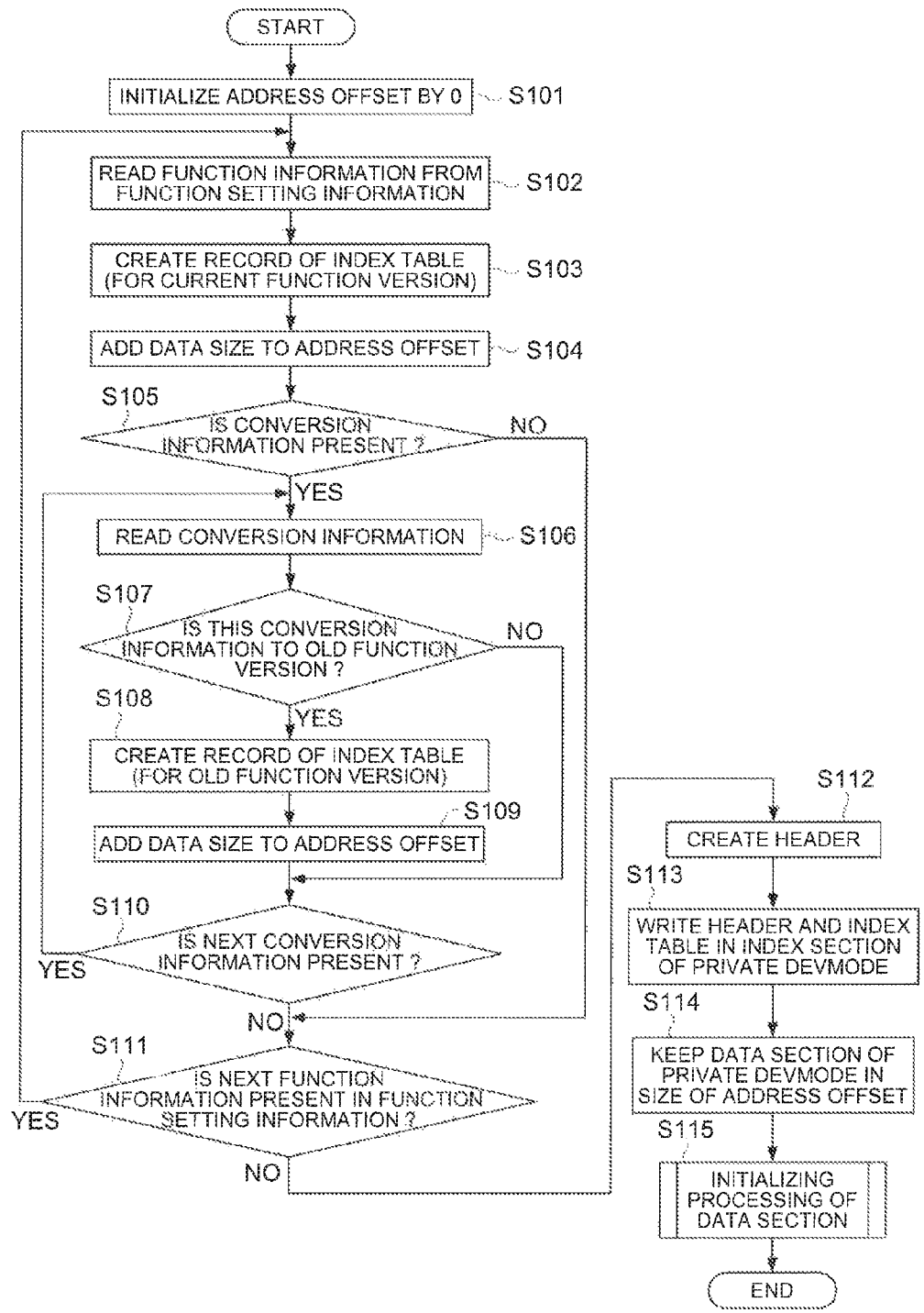
FIG. 17 is a flow chart showing creation processing of the private DEVMODE according to an embodiment of the present invention.
Figure 18:
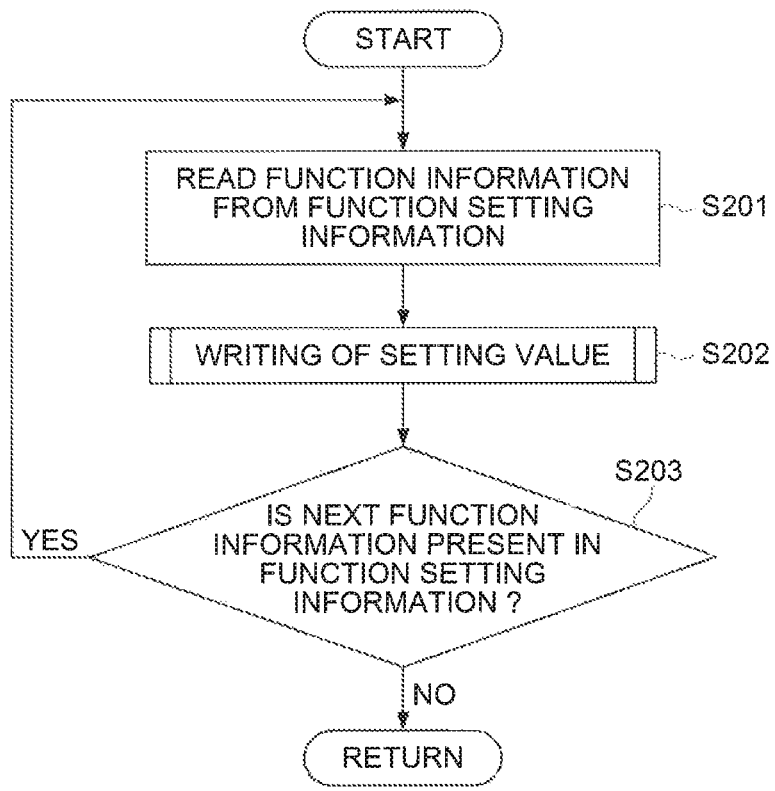
FIG. 18 is a flow chart showing initialization processing of the data section according to an embodiment of the present invention.
Figure 19:
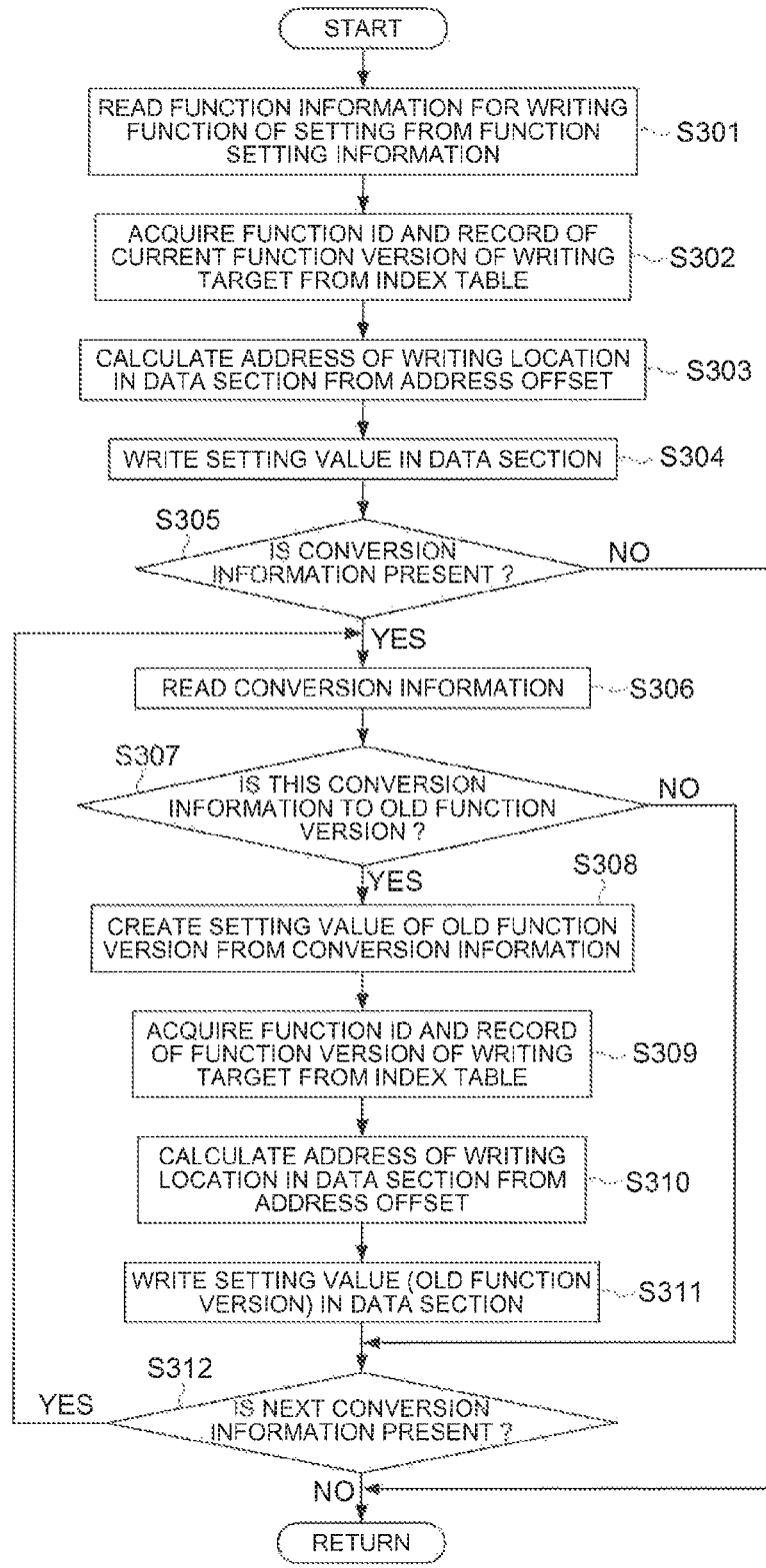
FIG. 19 is a flow chart showing writing processing of the setting value according to an embodiment of the present invention.

The aforementioned processing will be described with reference to the flow charts of FIG. 17 through FIG. 19. It should be noted that FIG. 17 is a flow chart showing the private DEVMODE creation processing executed by the private DEVMODE creating section of the DEVMODE processing execution section, while FIG. 18 is a flow chart showing the details of the initialization of the data section in FIG. 17. FIG. 19 is a flow chart showing the details of the process of setting value writing in FIG. 18.

As shown in FIG. 17, the address offset of the DEVMODE structure is initialized by "0" (S101). Then the function information is read from the function setting information (S102), and the record of the index table for the current function version is generated (S103). Then data size is added to the address offset (S104). Then a decision is made on whether or not conversion information is present (S105). If there is no conversion information, the processing goes to S111.

If there is conversion information, the conversion information is read (S106), and a decision is made on whether or not this is the information for conversion to the old function version (S107). If this is not the information for conversion to the old function version, the processing goes to S110. If this is the information for conversion to the old function version, an index table for old function version is generated (S108), and data size is added to the address offset (S109). After that, a decision is made on whether or not the next conversion information is present (S110). If the next conversion information is present, the processing goes back to the S106 to repeat the same procedure.

If the next conversion information is not present, a decision is made on whether or not the next function information of the function setting information is present (S111). If the next function information is present, the processing goes back to S102 to repeat the same procedure. If the next function information is not present, a header is mated (S112), and header and index table are written into the index section of the private DEN MODE (S113). The data section of the private DEVMODE is ensured in conformity to the size of the address offset (S114). After that, the data section (to be described later) is initialized (S115).

In data section initialization (S115), the function information is read from the function setting information, as shown in FIG. 18, (S201), and writing of the setting value into the data section (to be described later) is performed (S202). After that a decision is made on whether or not the next function information is present in the function setting information (S203). If the neat function information is present, the processing goes hack to S201 to repeat the same procedure.

In the process of writing the setting value into the data section (S202), as shown in FIG. 19, the function information for a function for which the setting value is written is read from the function setting information (S301). Then the function ID of the item to be written and the current function version record are acquired from the index table (S302). Then the address of the writing location in the data section is calculated from the address offset (S303). Then the setting value is written at the calculated address (S304).

Then a decision is made on whether or not conversion information is present (S305). If there is no conversion information, processing of writing terminates. If there is conversion information, the conversion information is read (S306), and a decision is made on whether or not this is the information for conversion into the old function version (S307). If this is not the in or for conversion into the old function version, the processing goes to S312. If this is the information for conversion into the old function version, the setting value of the old function version is generated from the conversion information (S308). Then the function ID of the item to be written and the record of the current function version are acquired from the index table (S309), and the address of the writing location in the data section is calculated from the address offset (S310). Then the setting value of the old function version is written into the calculated address (S311). After that, a decision is made on whether or not the next conversion information is present (S312). If the next conversion information is present, the processing goes back to S306 to repeat the same procedure.

As described above, the private DEVMODE of the DEVMODE structure is made up of an index section and data section. When the current printer driver generates a private DEVMODE, the setting value of each function of the old version, in addition to the setting value of each function of the current printer driver, is written into the data section, and the address offset for accessing each setting value is written into the index section. This allows the aforementioned DEVMODE structure to be used by the printer driver for controlling the image forming apparatus 30 of a different model and the printer driver of a different version.

The above has described the case of generating a new DEVMODE structure. The following describes the case of the pre-generated DEVMODE structure being employed by another printer driver.

[Conversion Processing of Setting Value]

FIG. 14 is a schematic diagram representing the case of converting the setting value of the old function version into the setting value of the new function version. This is the case where the DEVMODE structure is used by the printer driver for controlling the image forming apparatus 30 of a new model or the printer driver of a new version. When the DEVMODE structure is used, conversion is performed to convert into the value corresponding to the printer driver of its own. It should be noted that the entire conversion processing is performed by the print setting information processing section of the printer driver that employs the DEVMODE structure. (1) The record of the same function ID as the function held in the conversion destination (function that can be set by the image forting apparatus 30 controlled by the printer driver that uses the DEVMODE structure) is acquired from the index table of the index section in the private DEVMODE of the conversion origin. (2) The setting value ID is acquired from the address offset in the record. (3) Based on the conversion information of the conversion destination, the setting value ID of the function version of the conversion origin is converted into the setting value ID corresponding to the current function version. (4) The acquired setting value ID is written into the data section of the private DEVMODE of the conversion destination.

FIG. 15 is a schematic diagram for converting the setting value of a new function version into the setting value of the old function version. This is the case where the DEVMODE structure is used by the printer driver controlling the image forming apparatus 30 of the old model or the printer driver of the old version. When the DEVMODE structure is used, conversion is performed to convert into the value corresponding to the printer driver of its own. Similarly to the aforementioned case, entire conversion processing is performed by the print setting information processing section of the printer driver that uses the DEVMODE structure. (1) The record of the same function ID as the ft-diction held in the conversion destination is acquired from the index table of the index section in the private DEVMODE of the conversion origin. In this case, since the function version of the conversion destination cannot be accommodated within the range of the friction compatibility of the conversion origin in the acquired record, the record of the old function version is reacquired in the next step. (2) The record corresponding to the same function ID and function version as the function held in the conversion destination, is acquired from the index table of the index section in the private DEVMODE of the conversion origin. (3) The setting value ID is acquired from the address offset in the record. (4) The acquired setting value ID is written into the data section of the private DEVMODE of the conversion destination.

FIG. 16 is a schematic diagram showing the case within the range of compatibility between function versions. This is the case where DEVMODE stricture is used by the printer driver for controlling the image forming apparatus 30 of a different model or the printer driver of a different version. Since the version is kept within the range of compatibility between function versions, there is no need of converting the value into the value corresponding to the printer driver of its own. (1) The record of the seine function ID as the function held in the conversion destination is acquired from the index table of the index section in the private DEVMODE of the conversion origin. (2) The setting value ID is acquired from the address offset in the record. (3) Since the acquired setting value ID is within the range of compatibility between function versions, this ID is directly written into the data section of the private DEVMODE of the conversion destination.

Figure 20:
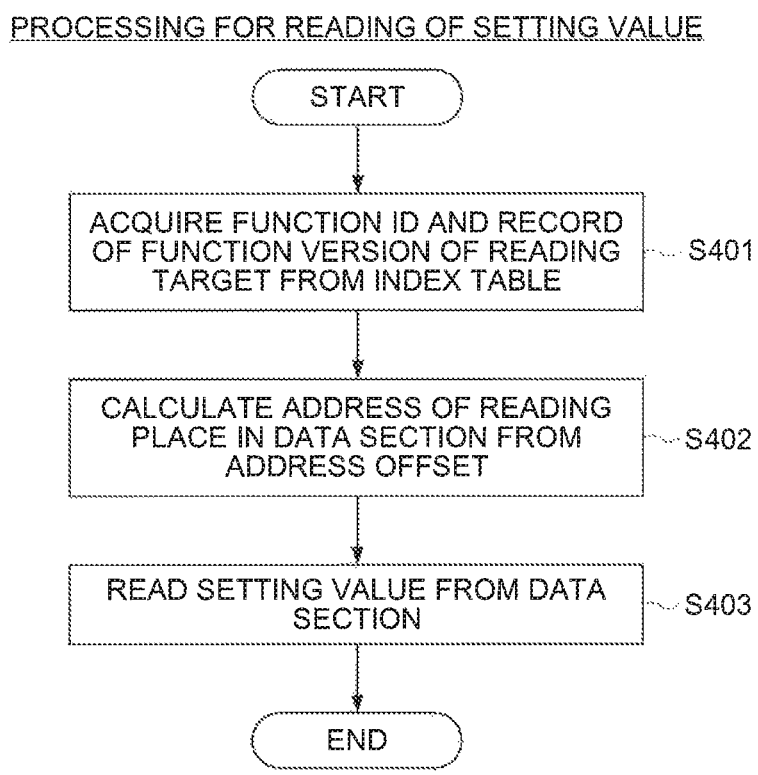
FIG. 20 is a flow chart showing reading processing of the setting value according to an embodiment of the present invention.

The aforementioned processing will be described with reference to the flow charts of FIGS. 20, 21-1 and 21-2. FIG. 20 is a flow chart representing the processing of reading the setting value from the data section, and FIGS. 21-1 and 21-2 show a flow chart showing the processing of converting the setting value.

In the first place, the setting reading section in the DEVMODE processing execution section reads the setting value of FIG. 20. To put it more specifically, the function ID for the item to be read and the record of the current function version are acquired from the index table of the index section in the private DEVMODE of the conversion origin (S401). This is followed by the step of calculating the address of the read-in location in the data section from the address offset (S402). Setting values corresponding to the function. ID and the function version are read from the data section (S403).

Figures 1, 21:
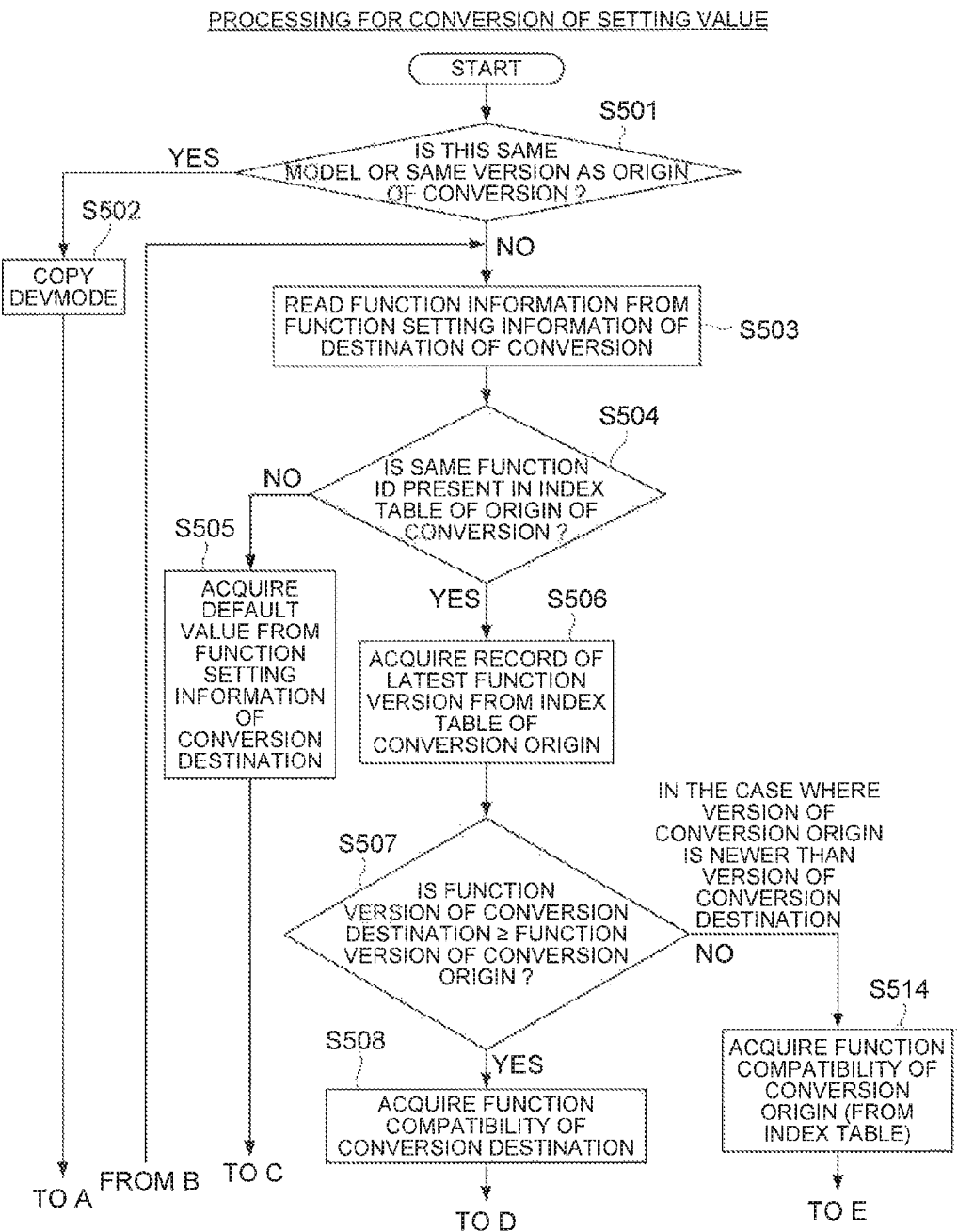
Figures 2, 21:
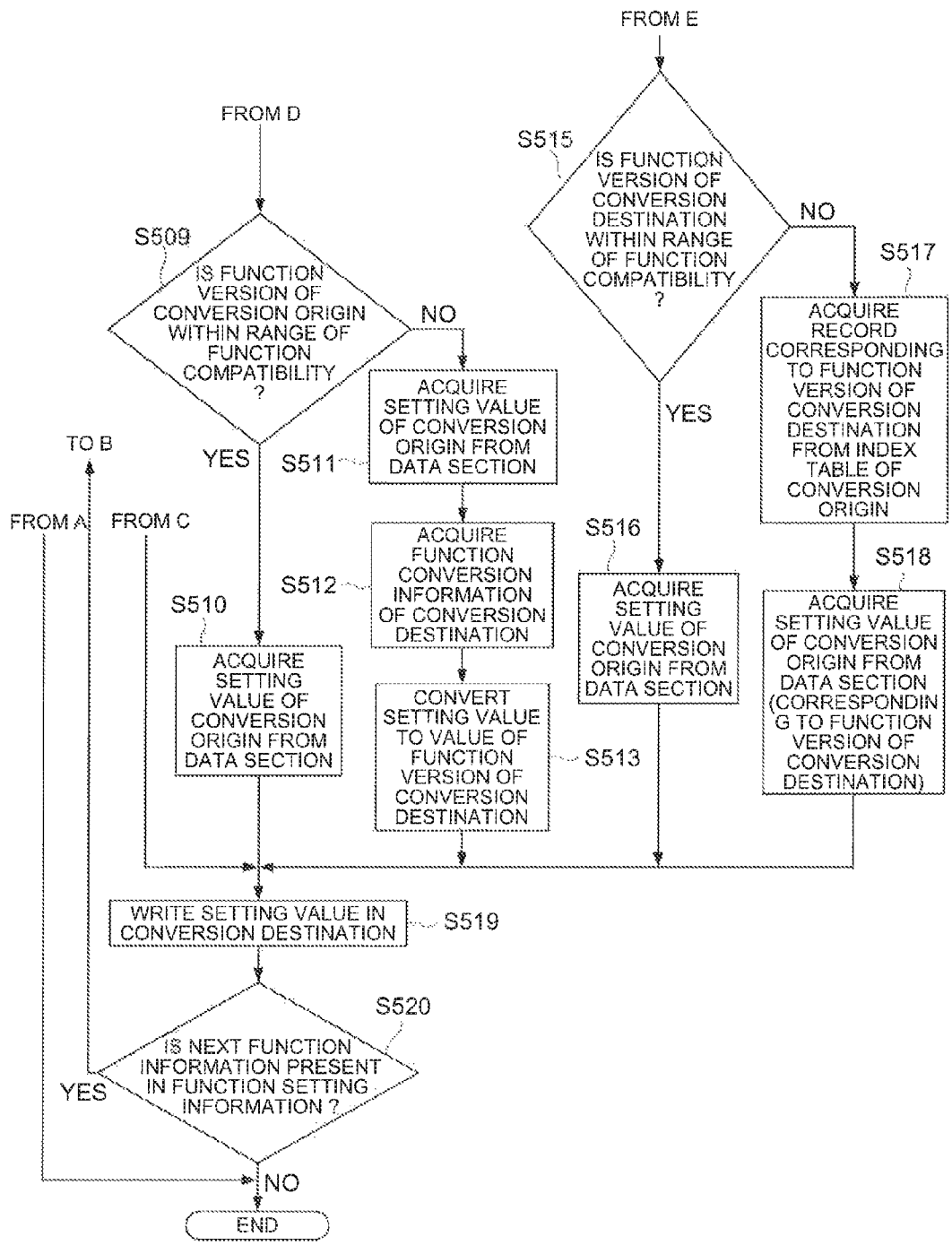

After that, the conversion section and setting writing section in the DEVMODE processing execution section execute the setting value conversion processing shown in FIGS. 21-1 and 21-2 so that the setting value is written. To put it more specifically, the system determines if the printer driver using the setting value is the printer driver for controlling the image forming apparatus 30 of the same model, or the printer driver of the same version as the printer driver having generated the private DEVMODE of the conversion origin (S501). In the case of the same model or same version, the private DEVMODE is copied (S502) and the processing terminates. If the printer driver is not for the same model or same version, the function information is read from the function setting information of the conversion destination (S503), and a decision is made on whether or not the same function ID is included in the index table of the index section in the private DEVMODE of the conversion origin (S504). If the same function ID is not included therein, a default value is acquired from the function setting information of the conversion destination (S505), and the acquired setting value is written to the private DEVMODE of the conversion destination (S519).

If the same function ID is present, the record of the most updated function version is acquired from the index table of the index section in the private DEVMODE of the conversion origin (S506). A decision is made on whether or not the function version of the conversion destination is newer than the function version of the conversion origin (S507).

If the function version of the conversion destination is newer or is the same as the function version of the conversion origin, the function compatibility of the conversion destination is acquired (S508). Whether or not the function version of the conversion origin is within the range of function compatibility is determined (S509). If the function version is within the range of function compatibility the setting value of the private DEVMODE of the conversion origin is acquired from the data section (S510), and the acquired setting value is written to the private DEVMODE of the conversion destination (S519). If the function version is not within the range of function compatibility, the setting value of the private DEVMODE of the conversion origin is acquired from the data section (S511), and the function conversion information of the conversion destination is acquired (S512). The setting value acquired from the conversion origin is converted into the function version value of the conversion destination (S513), and the converted setting value is written into the private DEVMODE the conversion destination (S519).

In the meantime, if the function version of the conversion origin is newer in S507, the function compatibility is acquired from the index table of the index section in the private DEVMODE of the conversion origin (S514). Whether or not the function version of the conversion destination is within the range of function compatibility is determined (S515). Utile function version is within the range of function compatibility, the setting value of the private DEVMODE of the conversion origin is acquired from the data section (S516) and the acquired setting value is written into the private DEVMODE of the conversion destination (S519). If the function version is not within the range of function compatibility, a record corresponding to the function version of the conversion destination is acquired from the index table of the conversion origin (S517). The setting value of the private DEVMODE of the conversion origin (the setting value corresponding to the function version of the conversion destination) is acquired from the data section (S518), and the acquired setting value is written into the private DEVMODE of the conversion destination (S519).

After that, whether the next function information in the function setting information is present or not is determined (S520). If the next function information is present, the processing goes back to the Step S503 to repeat the same procedure.

As described above, when the function version of the conversion origin is different from that of the conversion destination, the function compatibility is employed to convert the setting value. This allows the previously generated DEVMODE structure to be used by the printer driver for controlling the image forming apparatus 30 of a different model and the printer driver of a different version.

FIG. 22 is an operation table representing the operation at the time of the setting value conversion for each of the function version and functions compatibility of the conversion origin (model B) and of the conversion destination (model A).

If both the function version of the conversion origin and that of the conversion destination are "1" based on FIG. 22. (see Case 1), the setting value of the conversion origin can be directly used by the conversion destination.

If the function version of the conversion origin is older than that of the conversion destination (see Cases 2 and 4), the function compatibility information of the model A of the conversion destination (function compatibility information held by the printer driver for controlling the image forming apparatus 30 of the model A) is used. If the function version of the conversion origin is within the function compatibility (Case 2), the setting value is used directly. If the function version is not within the function compatibility (Case 4), the setting value of the model B (the setting value of the private DEVMODE generated by the printer driver for controlling the image forming apparatus 30 of the model B) is used after conversion based on the conversion information.

If the function version of the conversion origin is newer than that of the conversion destination (see Cases 3 and 5), the function compatibility information of the model B of the conversion origin is employed. If the function version of the conversion destination is within the function compatibility (Case 3), the setting value is used directly if the function version is not within the function compatibility (Case 5), the value (the value corresponding to the function version of model A) of the setting value of the model B (the setting value of the old version of the private DEVMODE generated by the printer driver for controlling the image forming apparatus 30 of model B) is used.

When there is no function at the conversion origin (see Case 6), the default value of the model A is employed because there is no information about the conversion origin. When there is no function at the conversion destination (Case 7), no action is taken.

According to the information processing apparatus, printer driver, print setting method and data structure according to the embodiments of the present invention, a data structure (DEVMODE structure) that can be used in a printer driver for different model or a printer driver of a different version as well can be generated.

This is because in the information processing apparatus (Printer driver) for giving printing instructions to a printing device, the data structure including the data section that stores the actual data of the setting value for the function and index section that stores the information for accessing the actual data of the setting value is generated based on the previously stored function information on the function of the printing device, and the data section stores the setting value that can be used by the printer driver for giving printing instructions to the printing device of a different model and/or the printer driver of a different version, in addition to the setting value of the printer driver for giving printing instructions to the printing device.

And for another thing, in the information processing apparatus (printer driver) for giving printing instructions to the printing device, the setting value stored in the previously generated data structure is read, and the compatibility of the setting value for each function is checked so that the setting value may be taken over to the printer driver of this device. If it is determined that the conversion is necessary, the value is converted into the setting value that can be recognized by that printer driver, and the converted setting value is written into the data structure.

This procedure ensures that even if there is no information about the printer driver that generated the private DEVMODE, the DEVMODE structure which has been made by the printer driver can be read by a printer driver that controls a printing device of a different model or a printer driver of a different version. Further, since the index section provided in the private DEVMODE has a common format of the printer drivers that control the printing devices of all models and has a fixed length, it is easy to search the DEVMODE structure for a desired setting value.

The present invention can be utilized in an information processing apparatus, print setting program, and print setting method wherein a DEVMODE structure is used for print setting and a DEVMODE structure.

It is to be noted that the present invention is not restricted to the above-mentioned Examples. The structure and control can modified properly, without departing from the spirit and scope of the present invention.

What is claimed is:

1. An information processing apparatus comprising:
   a storage section for storing function information on a function provided in a printing device; and
   a creating section for creating a data structure based on the function information, the data structure including:
      a data section for storing actual data of a setting value for the function; and
      an index section for storing information for accessing the actual data of the setting value,
   wherein in addition to the setting value for a printer driver which gives a printing instruction to the printing device, the creating section allows the data section to store the setting value which can be used by at least one of a printer driver which gives the printing instruction to the printing device of a different model and the printer driver of a different version.

2. The information processing apparatus of claim 1, wherein the creating section allows the data section to store the setting value for the function provided in the printing device and the setting value for the function of an old version.

3. The information processing apparatus of claim 1, further comprising:
   a reading section for reading the setting value stored in the data structure;
   a judgment section which determines whether the setting value for each of the function has compatibility enabling the setting value to be taken over to the printer driver of the information processing apparatus;
   a converting section for converting the setting value into the setting value which can be used by the printer driver of the information processing apparatus when the conversion is determined to be necessary by the judgment section; and
   a writing section for writing the converted setting value in the data structure.

4. The information processing apparatus of claim 1, wherein the data structure is a DEVMODE structure.

5. A non-transitory computer-readable recording medium storing a printer driver operated in an apparatus which gives a printing instruction to a printing device, the printer driver allowing the apparatus to function as a creating section which creates a data structure based on function information on a function provided in the printing device, the function information having been stored in advance and the data structure comprising:
   a data section which stores actual data of a setting value for the function; and
   an index section whit stores information for accessing the actual data of the setting value,
   wherein in addition to the setting value for the printer driver, the creating section allows the data section to store the setting value which carne used by at least one of a printer driver which gives the printing instruction to the printing device of a different model and the printer driver of a different version.

6. The non-transitory computer-readable recording medium of claim 5,
   wherein the creating section allows the data section to store the setting value for the function provided in the printing device and the setting value for the function of an old version.

7. The non-transitory computer-readable recording medium of claim 5, the printer driver further allowing the apparatus to function as:
   a reading section for reading the setting value stored in the data structure;
   a judgment section which determines whether the setting value for each of the function has compatibility enabling the setting value to be taken over to the printer driver;
   a converting section for converting the setting value into the setting value which can be used by the printer driver when the conversion is determined to be necessary by the judgment section; and
   a writing section for writing the converted setting value in the data structure.

8. The non-transitory computer-readable recording medium of claim 5,
   wherein the data structure is a DEVMODE structure.

9. A print setting method in an apparatus which gives a printing instruction to a printing device, the print setting method comprising:
   creating a data structure based on function information on a function provided in the printing device, the function information having been stored in advance and the data structure including:
      a data section which stores actual data of a setting value for the function; and
      an index section which stores information for accessing the actual data of the setting value,
   wherein, in the creating step, in addition to the setting value fix a printer driver for giving the printing instruction to the printing device, the setting value which can be used by at least one of a printer driver which gives the printing instruction to the printing device of a different model and the printer driver of a different version is stored in the data section.

10. The print setting method of claim 9,
    wherein in the creating step, the setting value for the function provided in the printing device and the setting value for the function of art old version are stored in the data section.

11. The print setting method of claim 9, further comprising:
    reading the setting value stored in the data structure;
    determining whether the setting value for each of the function has compatibility enabling the setting value to be taken over to the printer driver of the apparatus;

converting the setting value into the setting value which can be used by the printer driver of the apparatus when the conversion is determined to be necessary in the determining step; and writing the converted setting value in the data structure.

12. The print setting method of claim 9, wherein the data structure is a DEVMODE structure.

13. A non-transitory computer-readable recording medium storing a data structure created by an apparatus which gives a printing instruction to a printing device, the data structure comprising:

a data section which stores actual data of a setting value for a function provided in the printing device; and an index section which stores information for accessing the actual data of the setting value, wherein in addition to the setting value for the printer driver for giving the printing instruction to the printing device, the data section stores the setting value which can be used by at least one of a printer driver which gives the printing instruction to the printing device of a different model and the printer driver of a different version.

14. The non-transitory computer-readable recording medium of claim 13, wherein the data section has the setting value for the function provided in the printing device and the setting value for the function of an old version.

15. The non-transitory computer-readable recording medium of claim 13, wherein the data structure is a DEVMODE structure.

\* \* \* \* \*